Patented July 24, 1934

1,967,912

UNITED STATES PATENT OFFICE 1,967,912

COLOR LAKE

Herbert Holroyd Stocks and Frank William Linch, Blackley, Manchester, England, assignors to Imperial Chemical Industries, Limited, London, England, a British company No Drawing. Application May 26, 1932, Serial No. 613,770. In Great Britain June 1, 1931

5 Claims. (Cl. 260—11)

It is known that color lakes may be obtained from basic dyestuffs containing or not acid groups, by treating them with hetero-poly-acids such as phosphotungstic acid, phosphomolybdic acid, phosphotungstomolybdic acids and the like, and that these color lakes have excellent properties, particularly fastness to light and brightness of shade.

By the present invention color lakes of excellent fastness to light and brightness of shade and distinguished by great tinctorial power are obtained by acting on basic dyestuffs, which term is intended to embrace the sulfonated basic dyestuffs, with hetero-poly-acids, containing phosphorus, molybdenum, silicon and tungsten together with complex hetero-poly-acids containing the radicals of gallic and tannic acids.

The hetero-poly-acids containing phosphorus, molybdenum, silicon and tungsten used in accordance with the invention are, for example, the various phosphotungstic acids, phosphomolybdic acids, silicotungstic acids, molybdophosphotungstic acid, silicomolybdotungstic acid, that is to say, such acids which contain a plurality of radicals of phosphoric-, silicic-, molybdic- and tungstic acids, which will be termed for simplicity mineral hetero-poly-acids.

The complex hetero-poly-acids containing the radicals of gallic and tannic acids used in accordance with the invention are, for example, the gallomolybdic and gallotungstic acids described by Fernandes (Gazzetta Chimica Italiana, 1923, Vol. 53, p. 514). These we will term for simplicity organo-hetero-poly-acids.

In carrying the invention into practical effect, we may proceed in various ways. For example, we may add to a solution of the basic dyestuff, at the ambient or raised temperature, a solution containing both the mineral hetero-poly-acid and the organo-hetero-poly-acid, or we may add each in a separate solution, simultaneously or one after the other. The precipitation of the color lake may take place in presence or absence of a substratum such as blanc-fixe, and in presence or absence of dispersing or softening agents such as Turkey-red oil.

The products, as indicated, exhibit a valuable combination of properties in that they are both fast to light and of high tinctorial strength. This is particularly shown in the so-called undertone strength.

The invention is illustrated, but not limited, by the following examples in which the parts are by weight:—

Example 1

15 parts of brilliant green crystals Y which is the sulphate of tetraethyl di-p-amino-triphenyl carbinol anhydride ("Colour Index" No. 662) are dissolved in 1500 parts of water and the solution is heated to 85° C. A solution of 38 parts of phosphotungstic acid and 5 parts of potassium digallomolybdate in 450 parts of water is added. The color lake is precipitated. Turkey-red oil (5 parts) is added immediately after the precipitation of the lake. The temperature is then raised to the boil and the lake immediately flooded with 2000 parts of water. After settling and washing by decantation, the lake is filtered off and dried.

The so-obtained product exhibits great lightfastness and has great tinctorial power, as shown by its very pronounced undertone strength.

Example 2

30 parts of Rhodamine 6ODN conc. which is the ethyl ester of diethyldiamino-dimethyl-o-carboxyphenylxanthenyl chloride are dissolved in 3000 parts of water and the solution is heated to 90° C. A hot mixture of 630 parts of a 10% solution of phosphotungstic acid (pH 1.8–1.9) and 180 parts of a 5% solution of potassum digallomolybdate is added. The lake is precipitated. Turkey-red oil (50 parts of a 5% solution) is added immediately after precipitation of the lake. The temperature is maintained for 20 minutes at 90° C. 5000 parts of cold water is then added. After settling and washing by decantation the lake is filtered off and dried.

The lake so obtained possesses great light-fastness and high tinctorial power.

Example 3

26.7 parts of methyl violet 2B ("Colour Index" No. 680) are dissolved in 4000 parts of water at 90° C. 700 parts of a 10% solution of phosphotungstic acid (pH 1.7–1.8) also heated to 90° C. are added, followed immediately by the addition of 200 parts of a 5% solution of potassium digallomolybdate. The temperature after precipitation of the lake is maintained at 90° C. for 45 minutes. The lake is then isolated in the usual way.

The violet lake prepared in this way exhibits high tinctorial power and excellent light fastness.

Example 4

30 parts of brilliant green crystals Y are dissolved in 3000 parts of water and the solution heated to 90° C. 700 parts of a 10% solution of phosphomolybdic acid (pH 2.5–2.6) mixed with 600 parts of a 5% solution of potassium monogallotungstate are heated to 90° C. and added to the solution of the dyestuff. The lake is immediately precipitated. The temperature is kept at 90° C. for 2 minutes and then 5000 parts of cold water are added. After settling and washing by decantation, the lake is filtered off and dried.

The product so obtained possesses greater lightfastness and tinctorial power than the corresponding phosphomolybdic acid lake.

*Example 5*

25 parts of brilliant green crystals Y are dissolved in 2500 parts of water at 90° C. 350 parts of a 10% solution of phosphotungstic acid (pH 2.5-2.6) mixed with a molybdotannic acid solution (see below) are then added to the dyestuff solution and the temperature kept at 90° C. for 2 minutes. After flooding with cold water, the lake is isolated in the usual way. The lake so obtained is distinguished by great tinctorial power.

The molybdic acid solution is prepared as follows:—8.05 parts of tannic acid are suspended in hot water and a solution of potassium carbonate added until the solution is just alkaline to brilliant yellow paper. 7.2 parts of a molybdic oxide are then gradually added to the above solution at the boil and after all has been added the temperature is kept at 100° C. for 10 minutes. The solution is then filtered.

*Example 6*

1 part of disulphine green B ("Colour Index" 667) is dissolved in 100 parts of a 1% aqueous solution of phosphotungstic acid and potassium digallomolybdate containing 0.86 parts of the former and 0.14 parts of the latter, at the boil. This solution is added to a suspension of aluminium hydroxide prepared by the addition of 40 parts of a 10% solution of aluminium sulphate to 18 parts of a 10% solution of sodium carbonate and then precipitated by the addition of 75 parts of a 10% solution of barium chloride at a temperature of 65° C. The lake is washed by decantation, filtered and dried.

The product exhibits great light-fastness and tinctorial power.

*Example 7*

25 parts of brilliant green crystals Y are dissolved in 2500 parts of water and precipitated at 90° C. with a mixture of 750 parts of a 10% solution of phosphomolybdotungstic acid and 300 parts of a 5% solution of potassium digallomolybdate. The temperature is maintained at 90° C. for 2 minutes and then flooded with cold water. The lake is isolated in the usual way.

*Example 8. Example of color lake from Victoria pure blue BO*

40 parts of Victoria Pure blue BO conc. which is the hydrochloride of pentaethyl triaminodiphenyl-alpha-naphthyl-carbinol anhydride are dissolved in 5400 parts of water and the solution heated to 90° C. 1650 parts of a 6% solution of phosphotungstic acid (Ph=2.3-2.4) previously heated to 90° C. is mixed with 300 parts of a 5% solution of potassium digallomolybdate and then immediately added to the solution of the dyestuff. The potassium digallomolybdate is prepared by the method described by Fernandes (Gazzetta Chimica Italiana, 1923, Vol. 53, p. 515).

The color lake is precipitated. The temperature is kept at 90° C. for twenty minutes and the color lake then flooded with cold water. After settling and washing the lake is filtered off and dried.

The so-obtained product exhibits good light fastness and high tinctorial power as shown by its very pronounced undertone strength.

We claim:

1. In a process of producing a color lake the steps which comprise reacting upon a basic dyestuff with both a mineral hetero-poly-acid selected from the group consisting of the acids containing a plurality of radicals of phosphoric-, silicic-, molybdic- and tungstic acids, and with an organo-hetero-poly-acid in which an organic acid of the group consisting of gallic and tannic acid is combined with an inorganic acid of the group consisting of molybdic and tungstic acid.

2. As a new product a color lake comprising essentially a basic dyestuff combined with a hetero-poly-acid selected from the group consisting of the acids containing a plurality of radicals of phosphoric-, silicic-, molybdic- and tungstic acids, and with an organo-hetero-poly-acid in which an organic acid of the group consisting of gallic and tannic acid is combined with an inorganic acid of the group consisting of molybdic and tungstic acid.

3. As a new product a color lake comprising essentially the ethyl ester of diethyldiamino-dimethyl-o-carboxyphenylxanthenyl chloride combined with phosphotungstic acid and with digallomolybdic acid.

4. As a new product a color lake comprising essentially the sulfate of tetraethyl di-p-amino-triphenyl carbinol anhydride combined with phosphomolybdotungstic acid and with digallomolybdic acid.

5. As a new product a color lake comprising essentially the hydrochloride of pentaethyl triaminodiphenyl-alpha-naphthyl-carbinol anhydride combined with phosphotungstic acid and digallomolybdic acid.

HERBERT HOLROYD STOCKS.
FRANK WILLIAM LINCH.